US010142702B2

(12) United States Patent
Vaculin et al.

(10) Patent No.: US 10,142,702 B2
(45) Date of Patent: Nov. 27, 2018

(54) SYSTEM AND METHOD FOR DYNAMIC ADVERTISEMENTS DRIVEN BY REAL-TIME USER REACTION BASED AB TESTING AND CONSEQUENT VIDEO BRANCHING

(71) Applicant: International Business Machines Corporation, Armonk, NY (US)

(72) Inventors: Roman Vaculin, Bronxville, NY (US); Kuntal Dey, New Delhi (IN); Seema Nagar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/954,526

(22) Filed: Nov. 30, 2015

(65) Prior Publication Data

US 2017/0155971 A1   Jun. 1, 2017

(51) Int. Cl.
| | |
|---|---|
| *H04N 21/81* | (2011.01) |
| *H04N 21/4223* | (2011.01) |
| *H04N 21/442* | (2011.01) |
| *G06K 9/00* | (2006.01) |
| *H04N 21/2187* | (2011.01) |
| *H04N 21/845* | (2011.01) |
| *G11B 27/10* | (2006.01) |

(52) U.S. Cl.
CPC ......... *H04N 21/812* (2013.01); *G06K 9/0061* (2013.01); *G06K 9/00335* (2013.01); *G11B 27/10* (2013.01); *H04N 21/2187* (2013.01); *H04N 21/4223* (2013.01); *H04N 21/44218* (2013.01); *H04N 21/8456* (2013.01)

(58) Field of Classification Search
CPC ............ H04N 21/812; H04N 21/2187; H04N 21/4223; H04N 21/44218
See application file for complete search history.

(56) References Cited

U.S. PATENT DOCUMENTS

| | | | | |
|---|---|---|---|---|
| 7,949,565 B1 * | 5/2011 | Eldering | ................ | G06Q 30/02 705/14.49 |
| 2005/0120372 A1 * | 6/2005 | Itakura | ............... | H04N 7/17318 725/46 |
| 2006/0149631 A1 * | 7/2006 | Brazell | .................. | G06Q 30/02 705/14.43 |
| 2006/0162071 A1 * | 7/2006 | Dixon | .................... | G06Q 30/02 5/93.1 |

(Continued)

*Primary Examiner* — Alexander Q Huerta
(74) *Attorney, Agent, or Firm* — Rahan Uddin, Esq.; McGinn IP Law Group, PLLC

(57) ABSTRACT

An apparatus and method for A/B testing including a storage device storing a set of data, an input device receiving input from a sensor according to a review of composed set of data, a processor receiving an input signal from the input device, the input signal including a plurality of criteria noted according to a time of the composed set of data, the processor processing the first set of data according to a feedback of the input signal. The processor analyzes the input signal and extracts the plurality of criteria from the input signal as extracted information. The processor composes the set of data from the storage device according to the extracted information, and sends the composed set of data, time segment by time segment, to the input device according to the feedback of the input signal.

3 Claims, 13 Drawing Sheets

(56) References Cited

U.S. PATENT DOCUMENTS

| | | | |
|---|---|---|---|
| 2006/0277102 A1* | 12/2006 | Agliozzo | G06Q 30/02 705/14.41 |
| 2007/0100688 A1* | 5/2007 | Book | G06Q 30/02 705/14.52 |
| 2008/0097829 A1* | 4/2008 | Ritter | G06Q 30/02 705/14.1 |
| 2008/0189156 A1* | 8/2008 | Voda | G06Q 10/063 705/7.33 |
| 2010/0070987 A1* | 3/2010 | Amento | H04H 60/33 725/10 |
| 2012/0151329 A1* | 6/2012 | Cordasco | G06F 11/3006 715/234 |
| 2013/0151333 A1* | 6/2013 | el Kaliouby | G06Q 30/0242 705/14.45 |
| 2013/0298146 A1* | 11/2013 | Conrad | H04N 21/252 725/12 |
| 2014/0282652 A1* | 9/2014 | Monnerat | H04H 60/33 725/14 |
| 2015/0039415 A1* | 2/2015 | Boldyrev | G06Q 30/0242 705/14.41 |
| 2015/0074650 A1* | 3/2015 | Bennett | G06F 11/3688 717/125 |
| 2015/0128159 A1* | 5/2015 | Weinblatt | H04N 21/44218 725/12 |
| 2015/0143392 A1* | 5/2015 | Silveira-Filho | H04H 60/33 725/10 |
| 2015/0248423 A1* | 9/2015 | Christolini | G06F 17/3089 715/202 |
| 2015/0256877 A1* | 9/2015 | Yoneda | G06Q 30/02 725/34 |
| 2015/0363302 A1* | 12/2015 | Young | G06F 11/3688 717/130 |
| 2016/0048855 A1* | 2/2016 | Ambrozic | G06Q 30/0203 705/7.32 |
| 2016/0085658 A1* | 3/2016 | Manion | G06F 8/65 717/124 |
| 2016/0227277 A1* | 8/2016 | Schlesinger | H04N 21/44218 |
| 2016/0253764 A1* | 9/2016 | Sinno | G06Q 50/01 705/319 |

* cited by examiner

1200

SYSTEM AND METHOD FOR DYNAMIC ADVERTISEMENTS DRIVEN BY REAL-TIME USER REACTION BASED AB TESTING AND CONSEQUENT VIDEO BRANCHING

BACKGROUND OF THE INVENTION

Field of the Invention

The disclosed invention relates generally to a method and apparatus for user testing and video branching, and more particularly, but not by way of limitation, relating to a method and apparatus for dynamic advertisements driven by real-time user reaction based A/B testing and consequent video branching.

Description of the Related Art

In business there has been an increased need for testing users for a review of products in a more efficient manner Therefore, videos have been used a vehicle for testing of products. Dynamic generation of videos is characterized by a constant change in generation of videos. Video templatization and soft real time generation of videos from templates can be carried out. Thereby, it is possible to dynamically generate videos and personalize them, over embodiments of given video templates.

A/B testing or also called split testing is an important function for many organizations that specialize in any form of advertising. In marketing and business intelligence, A/B testing compares two versions (A and B) to see which is better. For example, one can show the two variants A and B to similar visitors at the same time, and compare the two variants. Additionally, user attention and reaction based content presentation is a current topic of research, such as eye tracking based content presentation (zoom in, zoom out, etc.).

However, the current methods are unable to provide an efficient means of live testing and a method of providing accurate feedback of a testing comparison in real-time. Currently, much resources and time are needed to analyze the testing. Moreover, the testing is not automatically performed. Much user intervention is currently needed.

SUMMARY OF INVENTION

In view of the foregoing and other problems, disadvantages, and drawbacks of the aforementioned background art, an exemplary aspect of the disclosed invention provides a system and method of providing for dynamic advertisements driven by real-time user reaction based A/B testing and consequent video branching.

One example aspect of the disclosed invention provides a system, including a storage device storing a set of data, an input device receiving input from a sensor according to a review of composed set of data, a server receiving an input signal from the input device, the input signal including a plurality of criteria noted according to a time of the composed set of data, the server processing the first set of data according to a feedback of the input signal, wherein the server analyzes the input signal and extracts the plurality of criteria from the input signal as extracted information, and wherein the server composes the set of data from the storage device according to the extracted information, and sends the composed set of data, time segment by time segment, to the input device according to the feedback of the input signal.

The example system can also include a plurality of the input devices sending a plurality of the input signals, wherein the server composes the set of data from the storage device according to the extracted information, and sends the composed set of data, time segment by time segment, to the input device according to the feedback of the plurality of the input signals. The set of data includes a video stream that is time segmented by the server, and wherein the plurality of criteria includes motifs of the video stream, user reaction to a viewing of a portion of a composed version of the video stream, and eye tracking information.

The server can include a user reaction and eye tracking analyzer configured to analyze the input signal for the user reaction and tracking of eye information of a user to extract the extracted information. The server can include a split video manager that composes the set of data according to the extracted information and splits the video by time segments. The server can be a virtual server in the clouds.

Different initial time segments of the composed set of data can be shown to different users, and wherein a version of a later time segment than the initial time segments is selected according to input signal received by the server, the version being among a plurality of version of the later time segment of set of data stored in the storage device.

The set of data can include a video, and wherein for each of a plurality of users, a series of different motifs are shown during different times within a period of time, and then, while an intermediate part of the video is being shown, a later part of the video is selected by the server based upon a recorded reaction of each of the plurality of users, and the part of the video is selected accordingly.

The system can also include a second storage device storing policy and privacy rules, the server composing the set of data from the first storage device according to the policy and privacy rules. When the set of data is a video, the server can run live A/B split testing within the video.

Additionally, when the set of data is a video, the server can run live A/B (optional), such that server runs live A/B split testing within the video, and the server conducts the A/B split testing in parallel, in a live setting in real time, and across a plurality of audiences watching over multiple devices. The server can use a video template, with a first portion of the video that comprises of one or more test video segments, and a later portion of the video that comprises of one or more templates that need to be filled in dynamically after the first portion of the video has been run, but when the later portion of the video has not yet been run at the input device.

In another example aspect, the server includes a storage device storing a set of data, and a program executable by a processor, and the processor receives an input signal from a input device, the input device receiving input from a sensor according to a review of composed set of data, the input signal including a plurality of criteria noted according to a time of the composed set of data, the processor processing the first set of data according to a feedback of the input signal according to the program, wherein the processor analyzes the input signal and extracts the plurality of criteria from the input signal as extracted information according to the program, and wherein the processor composes the set of data from the storage device according to the extracted information, and sends the composed set of data, time segment by time segment, to the input device according to the feedback of the input signal according to the program.

The server can also include a plurality of the input devices sending a plurality of the input signals, wherein the processor composes the set of data from the storage device according to the extracted information, and sends the composed set of data, time segment by time segment, to the input device according to the feedback of the plurality of the input signals.

When the set of data includes a video stream that is time segmented by the processor, the plurality of criteria includes motifs of the video stream, user reaction to a viewing of a portion of a composed version of the video stream, and eye tracking information. Different initial time segments of the composed set of data are shown to different users, and wherein a version of a later time segment than the initial time segments is selected according to input signal received by the processor, the version being among a plurality of version of the later time segment of set of data stored in the storage device.

For each of a plurality of users, a series of different motifs are shown during different times within a period of time, and then, while an intermediate part of the video is being shown, a later part of the video is selected by the processor based upon a recorded reaction of each of the plurality of users, and the part of the video is selected accordingly.

In yet another example aspect of the disclosed invention, there is a method that includes storing in storage device a set of data, receiving, by an input device, input from a sensor according to a review of composed set of data, receiving, by a server, an input signal from the input device, the input signal including a plurality of criteria noted according to a time of the composed set of data, the server processing the first set of data according to a feedback of the input signal, wherein the server analyzes the input signal and extracts the plurality of criteria from the input signal as extracted information, and wherein the server composes the set of data from the storage device according to the extracted information, and sends the composed set of data, time segment by time segment, to the input device according to the feedback of the input signal.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF A PREFERRED EMBODIMENTS

Figure 1:
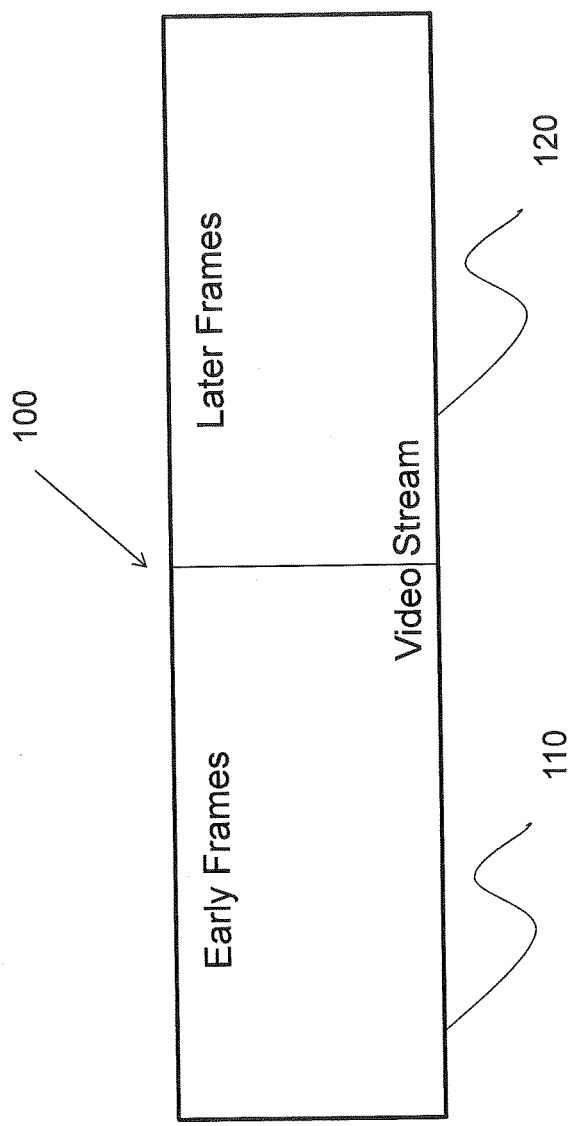
FIG. 1 illustrates a video stream used in an example embodiment.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

Currently, there is no live testing, monitoring and analyzing of the audience reaction, and dynamically updating a video (as it moves forward) based upon the test results. Such a monitoring is not performed with the video including analyzing all parts of the video itself.

Video content adoption or video branching in real-time setting, testing it live across a wide audience, as well as at a personal level in soft real time, based upon the outcome of any live testing, monitoring and analysis, is also missing.

Further, the current state of the art does not attempt to do any form of live (real-time) split-testing on a video broadcasted over a given channel, to measure the comparative effectiveness of different morphs of the same video, or attempt to gauge the user's current best focus zone on the screen.

Consequently, advertising delivery optimization, including punch line delivery (e.g., "drink ABC Cola", where "ABC Cola" is a product), is also suboptimal with respect to the known/expected reaction of the viewers (less personalized than is possible to attain).

Figure 2:
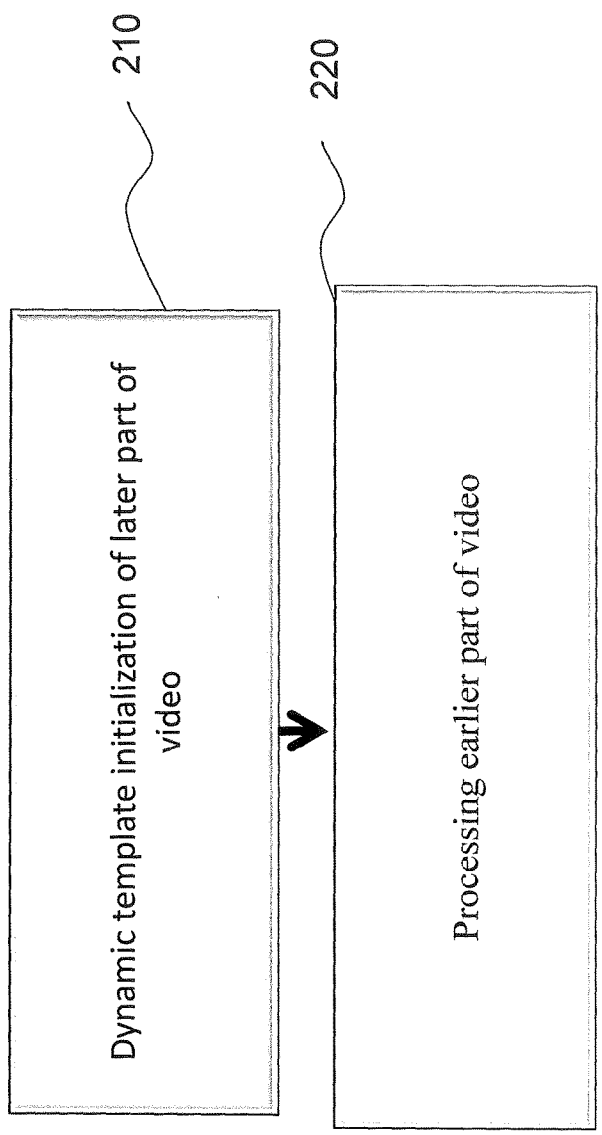
FIG. 2 illustrates a flowchart of a technique for video processing in an example embodiment.

Referring to FIGS. 1 and 2, one of the features of an example embodiment is to present a user with a video 100, the "later" part 120 (e.g., later frames of the video stream 100) of which would be dynamically initialized from a given template, using a video template initializer module, based upon the insights derived from measuring and A/B split testing of user's reaction and mood towards the earlier part of the video (210).

Moreover, an earlier part of the video 110 (e.g., early frames of the video stream) may or may not be a video template, depending upon the requirements of the later part of the video, and the length of the movie (220). For example, if a video is long enough, the A/B split testing may be done just for the current viewer across timeline within the video by having multiple segments to conduct a series of tests, and thereby "better" personalize the later part of the video using the insight derived from the tests.

Figure 3:
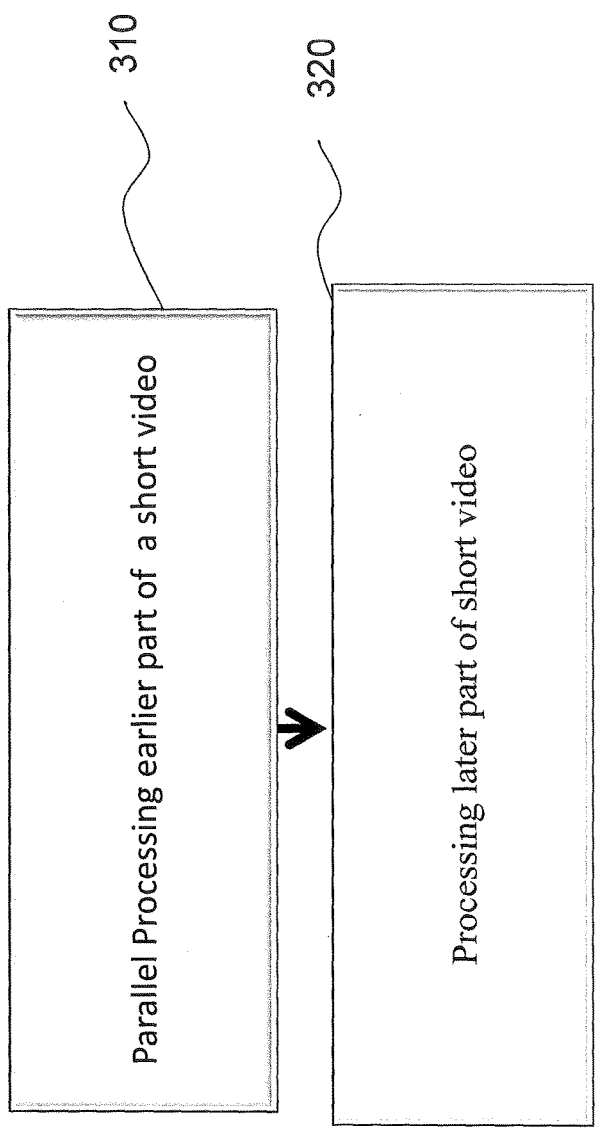
FIG. 3 illustrates another flowchart of a technique for video processing in an example embodiment.

On the contrary, referring to FIGS. 3 and 1, for a short video (e.g., 20 second advertisement), when there is not enough time to conduct A/B split testing on an individual user over a series of tests, a computer device can run in parallel different short tests on different segments of viewers watching from different devices, (e.g., a segment of known like-minded people or known social friends) for the earlier part of the video 110 (step 310) and then choose the later part 120 of the video embodiment en-mass to maximize the satisfaction for the maximum number of viewers (though not necessarily in a well-personalized manner for all viewers) (step 320).

Figure 4:
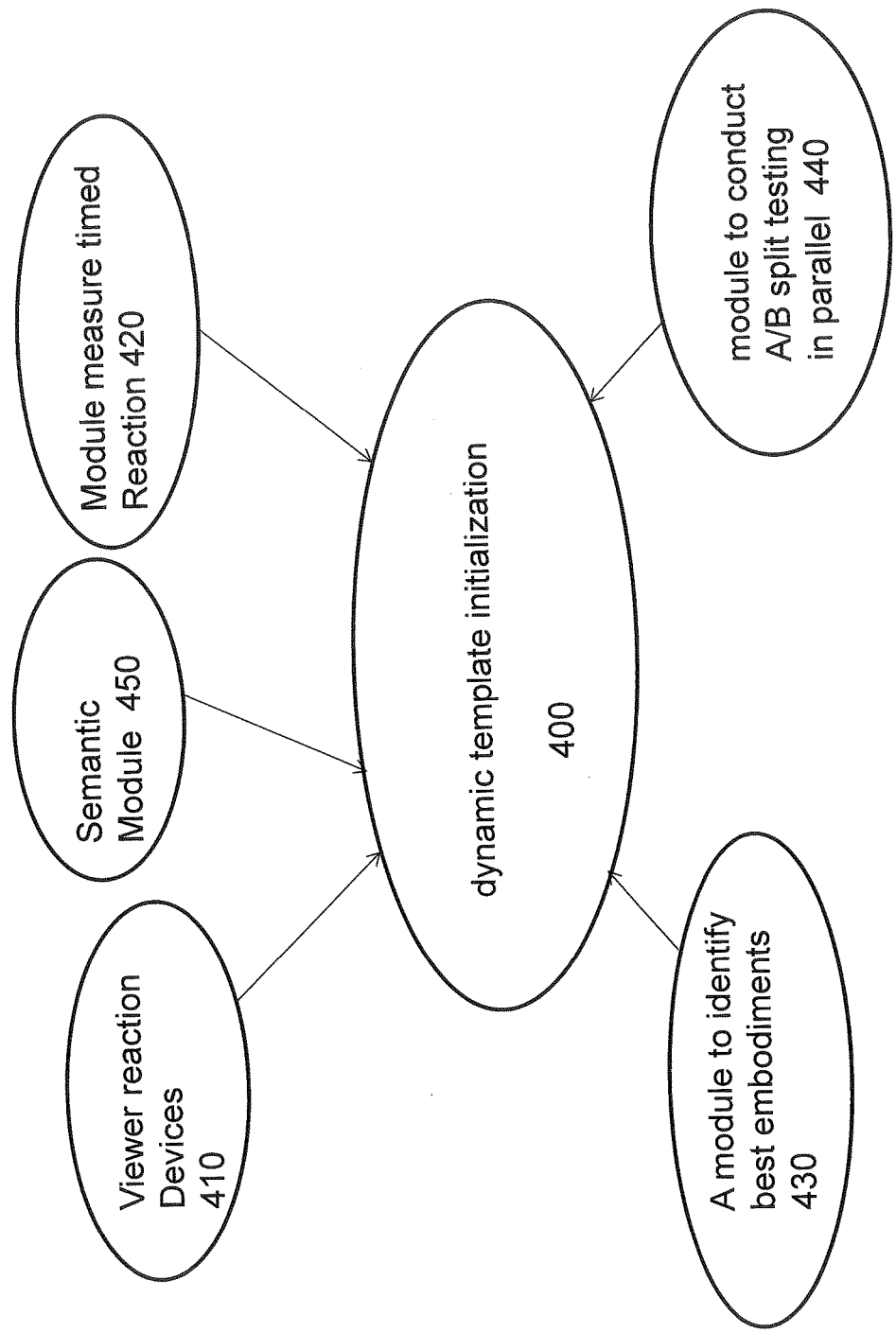
FIG. 4 shows factors for dynamic template initialization in an example embodiment.
Figure 5:
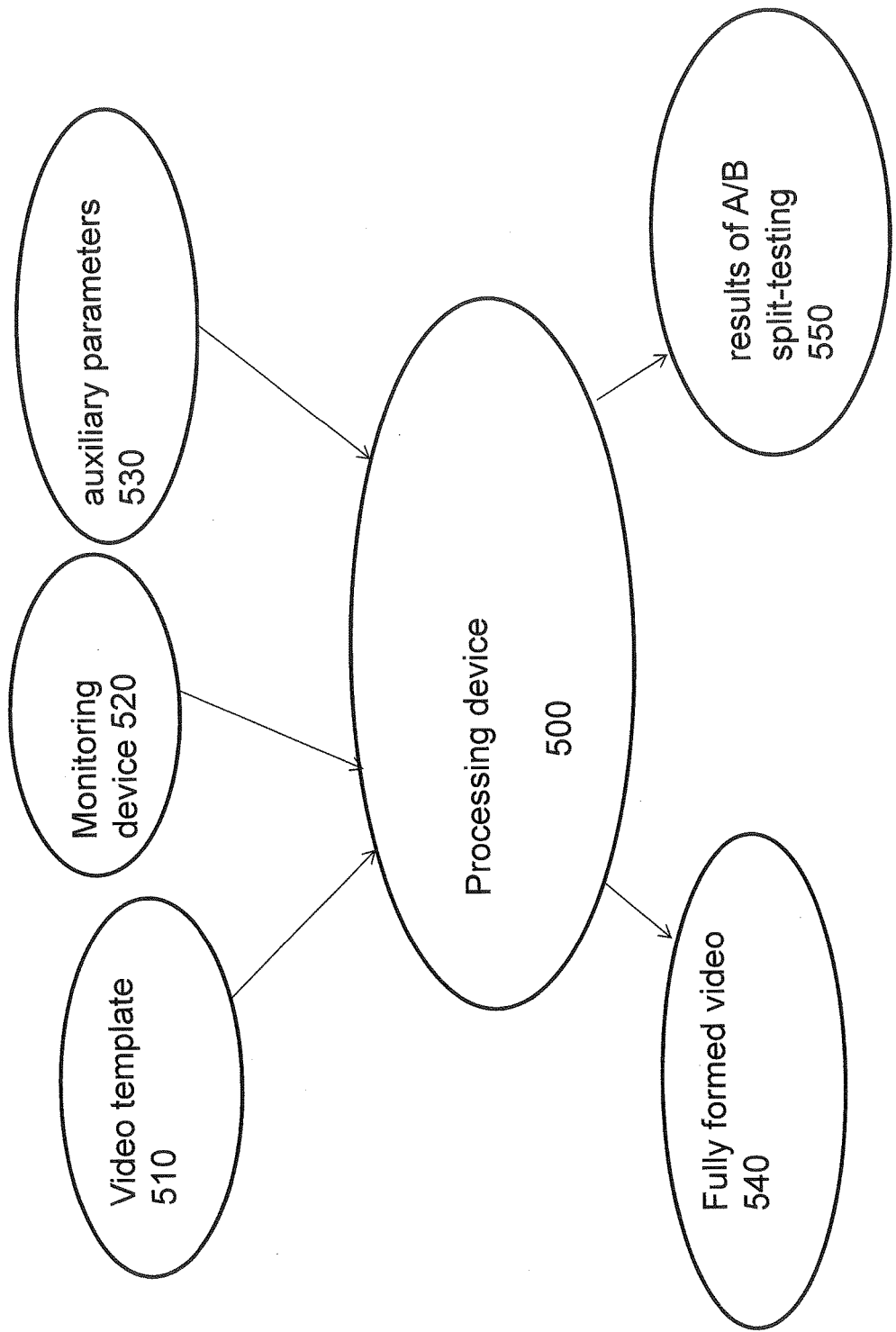
FIG. 5 illustrates the input and outputs to a processing device in an example embodiment.

Referring to FIG. 4, the video snippet (content) chosen by the dynamic template initialization 400, initializing the later part 120 of the video 100, would depend upon a few factors, as explained below.

One factor is a set of devices, such as a wearable glass, a mobile phone based camera or webcam, an eye-tracking device (such as TOBII, EYE LINK, EYE TRIBE, etc.) to observe viewer reaction 410, and a module to infer the semantics of such reaction 450.

Another factor would be a module to measure the reaction the user at a given instant of time 420, with respect to the video shown (for example, did the user focus on the screen at all or look away, if they focused on the screen then which part of the screen they focused more, did their heart beat increase a lot while watching, did they start blinking a lot or sweating, etc.).

Another factor is a module to identify the set of best embodiments 430 for the given viewer of the later part of the video, to embody the video template existing at the later part of the video, given the reaction of the viewer, based upon live (real-time) A/B split testing of the first (test) part of the video (over a series of test video segments lying within the test part of the video).

In FIG. 4, there is shown another module to perform individual A/B testing 460. This module for A/B testing 460 will perform individual A/B testing. The result of this will be made available to module identifying the best embodiment for a later part of the video.

Another factor is a module to conduct A/B split testing in parallel 440, in a live setting in real-time, across a multitude of audiences watching over multiple devices, for the first (test) part of the video, by presenting different test video segments, and aggregate per segment the observations in real-time to choose from a given set of candidates, the embodiments of the dynamic portion of the video template catered to different segments of viewers.

Inputs

A processing device 500 can include the following inputs.
There can be a video template (for example, an advertisement), with a first ("test") portion 110 that comprises of one or more test video segment, and a later portion 120 that comprises of one or more "templates" that need to be filled in dynamically after the first portion of the video has been run but the later portion has not yet been run 510. A set of permissible embodiments of the template video, including but not limited to a conclusion, a punch line.

Another input can be a device to monitor and analyze, in soft real time, the reaction of the viewers, towards the video shown 520. Optional auxiliary parameters 530 can be the environment, geography, time of day, context, user profiles etc.

Optional wearable devices that capture some of the biological parameters of a user (such as some of heart rate, breathing rate, perspiration rate, eye blinking rate, brain EEG signals etc.), which will be used to measure user reaction in-depth.

Outputs

Outputs can includes fully formed set of videos (in which, all templates would have been initialized) 540, in which, each video has been adopted by initializing the templates, using the results of A/B split testing of user's reaction to the initial segments of the video (the one or more test segments). The output can also include the results of A/B split-testing across a segment of viewers 550.

Sample Embodiment 1 (Short Ad (Advertisement))

A video advertisement for a Cola product, "ABC Cola", of 30 seconds of length, comprising of 3 segments, out of which, the first 15 seconds has 2 pre-determined versions, the next 5 seconds also has 2 pre-determined versions, and the third one, 10 seconds long, has 2×2=4 pre-determined versions.

Figure 6:
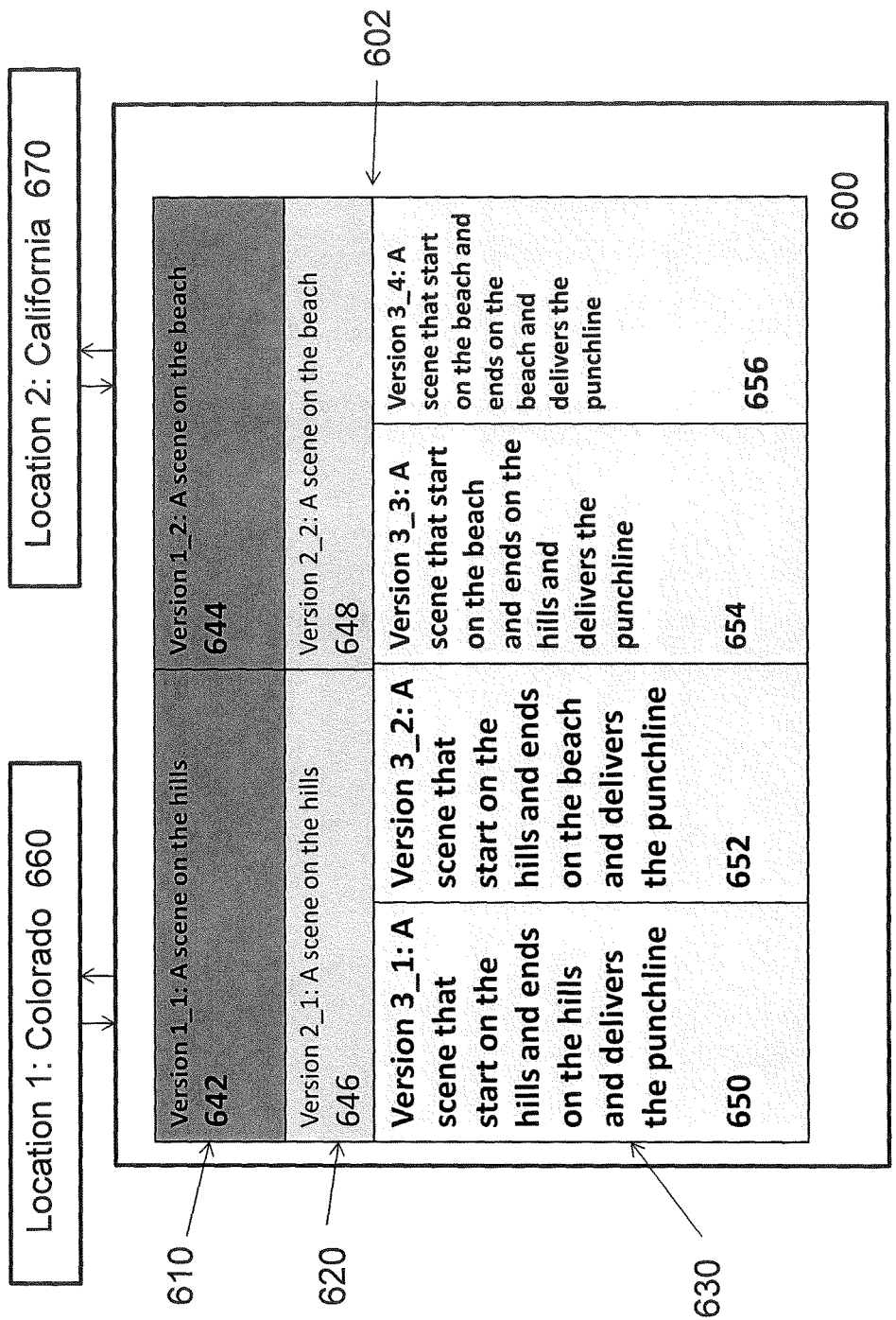
FIG. 6 illustrates an example processing of a short advertisement, according to an example embodiment.

Referring to FIG. 6, for the video stream 602, the advertisement will be catered to audience in Colorado 660 and California 670. For example, sensors can be located in Colorado 660 and California 670 and transmitted to the analyzing device or server 600 in a third location or in the clouds in a virtual server. The locations 660 and 670 can also include display devices for viewing the video stream 602 at the two remote locations. Therefore, the server 600 can be a virtual server in the clouds. The punchline to be delivered is "drink ABC Cola". The following would be the set of segments and versions.

Segment 1 (15 seconds) 610:
   Version 1_1: A scene on the hills 642; and
   Version 1_2: A scene on the beach 644.
Segment 2 (5 seconds) 620:
   Version 2_1: A scene on the hills 646; and
   Version 2_2: A scene on the beach 648.
Segment 3 (10 seconds) 630:
   Version 3_1: A scene that start on the hills and ends on the hills and delivers the punchline 650;
   Version 3_2: A scene that start on the hills and ends on the beach and delivers the punchline 652;
   Version 3_3: A scene that start on the beach and ends on the hills and delivers the punchline 654; and
   Version 3_4: A scene that start on the beach and ends on the beach and delivers the punchline 656.

The audience population is randomly divided into two approximately equal halves, for each of Colorado 660 and California 670. On one half of each geographical location 660 and 670, version 1_1 (642) is delivered, and on the other half, version 1_2 (644) is delivered, and this lasts for the first 15 seconds of the advertisement.

The reaction of the audience at each of the locations 660 and 670 are captured in each of the two segments, and these are analyzed by the server 600. While the analysis happens (which takes some time), version 2_1 ("hill" version) 646 is shown to the audience that had seen version 1_1 ("hill"

version) 642, and version 2_2 ("beach" version) 648 is shown to the audience that had seen version 1_2 ("beach" version) 644.

In the meantime, the analysis finds that the advertisement is engaging the California audience 670 more with the "hill" version but the Colorado 660 audience more with the "beach" version. This analysis is reflected on catering the final segment of the advertisement to the audience, as described subsequently.

In California 670, the audience segment that was shown "hill" (versions 1_1 and 2_1) are shown the punchline using version 3_1 ("hill-to-hill"). The audience segment that was shown "beach" (versions 1_2 (644) and 2_2 (648)) are shown the punch line using version 3_3 ("beach-to-hill") 654.

In Colorado 660, audience segment that was shown "hill" (versions 1_1 (642) and 2_1 (646)) are shown the punch line using version 3_2 ("hill-to-beach") 652. The audience segment that was shown the "beach" (versions 1_2 and 2_2) 644 and 648 are shown the punch line using version 3_4 ("beach-to-beach") 656.

Sample Embodiment 2 (Long Ad)

Figure 7:
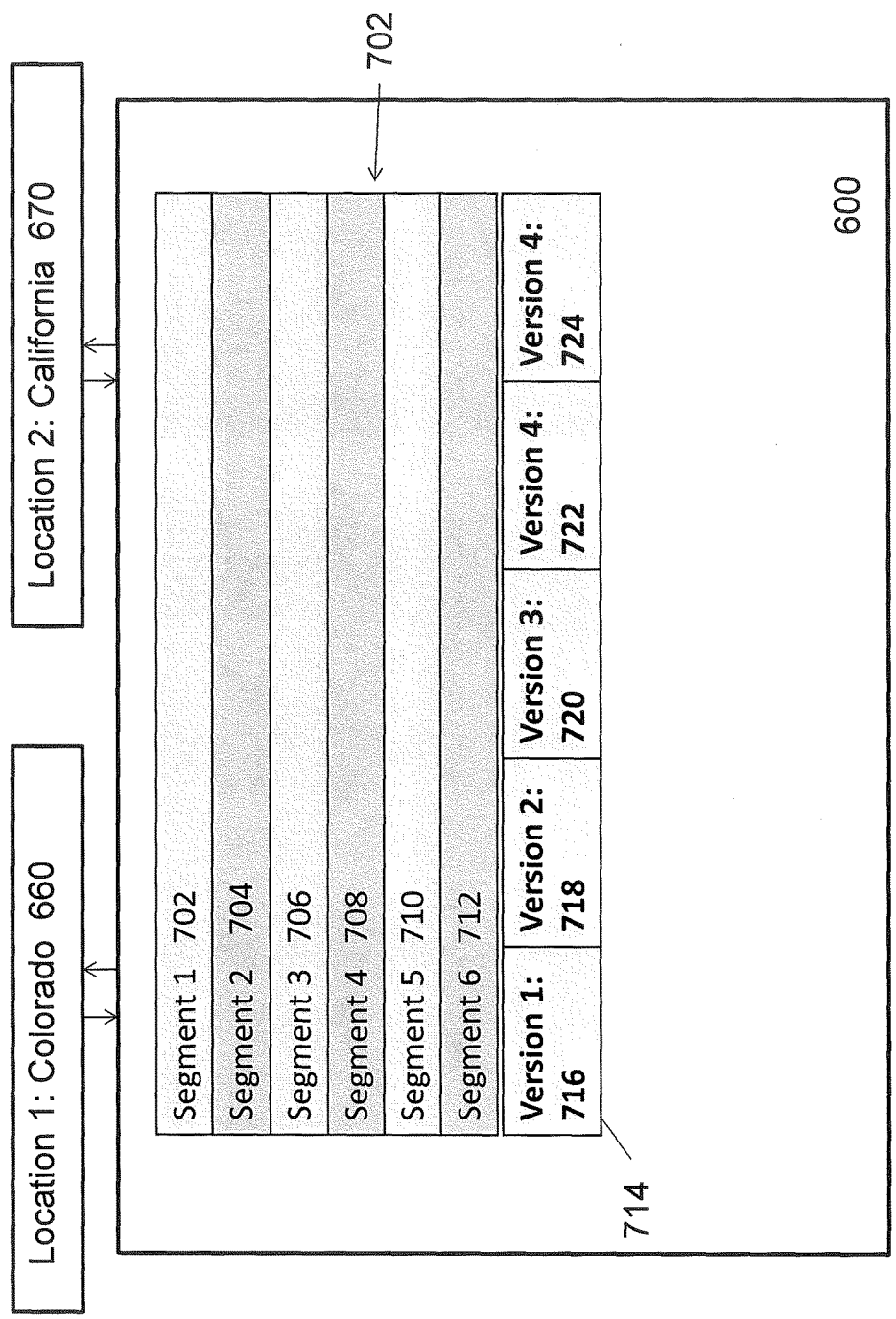
FIG. 7 illustrates an example processing of a long advertisement, according to an example embodiment.

Referring to FIG. 7, a second sample embodiment uses a long ad (advertisement) 702. A video ad of Cola of 300 seconds of length 702, includes 5 segments of 50 seconds of length each (702-710), a $6^{th}$ segment of 5 seconds (712), and a $7^{th}$ segment that is 45 seconds 714 that is processed on the server 600.

The first segment 702 is shown on a beach, which, at the end, transits gracefully to an agricultural landscape. The second segment 704 is shown on an agricultural landscape, which, at the end, transits gracefully to a well-flowered colorful garden. The third segment 706 is shown on a well-flowered colorful garden, which, at the end, transits gracefully to a hill top. The fourth segment 708 is shown on a hill top, which, at the end, transits gracefully to a forest. The fifth segment 710 is shown in a forest. The sixth segment 712 has also a forest (to enable the computation by the server till the previous step to complete). The seventh segment 714 has 5 versions, and contains a plurality of punch lines:

Version 1: the punchline is delivered on a beach, transiting from a forest 716;

Version 2: the punchline is delivered on an agricultural landscape, transiting from a forest 718;

Version 3: the punchline is delivered on a well-flowered colorful garden, transiting from a forest 720;

Version 4: the punchline is delivered on a hill top, transiting from a forest 722; and Version 5: the punchline is delivered on a forest, remaining within a forest 724.

The punch line to be delivered can be for example, "drink ABC Cola". An individual audience member or a plurality of audience members can be watching the TV at a single location 660 or multiple locations 660 and 670. The reactions of audience are analyzed after the first 5 segments are shown at server 600. It is noticed that the audience liked the beach version 716 the best. Hence, version 1 of the punch line 716 was chosen to deliver the punch line for the long advisement 702.

Please note that an audio stream can be substituted for the video stream in the long advertisement 702 or short advertisement 602. Additionally, audio output devices can be substituted for the displays for audio output portion of the displays can be used. Moreover, other types of output devices can be used for review by the audience. In addition, a plurality of different sensors could be used to receive the feedback from the audience to the server 600 when reviewing the advertisements 702 and 602.

Figure 8:
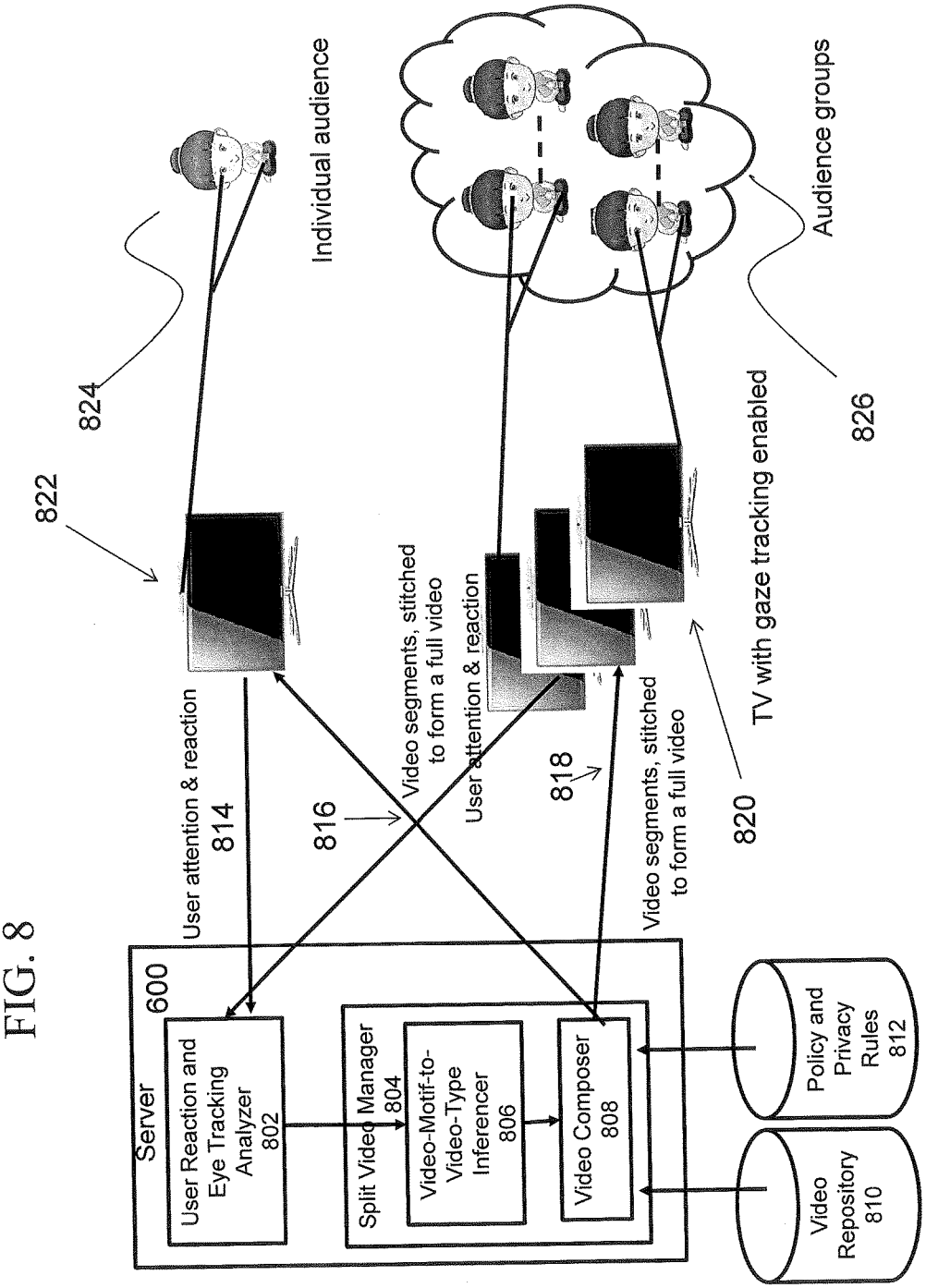
FIG. 8 illustrates an example system architecture diagram, according to an example embodiment.

FIG. 8 illustrates an example system architecture diagram, according to an example embodiment. The Server 600 can include a user reaction and eye tracking analyzer that receives the input 814 from the display and sensors at the first viewing station 822. When an individual audience member 824 views the advertisement, the sensors at the first viewing station 822 sends the user attention and reaction signal 814 to the user reaction and eye tracking analyzer 802 on the server 600. A plurality of audience groups 826 can view at the second viewing station 820. The second viewing station can include, for example televisions with gaze tracking enabled to send back to the user reaction and eye tracking analyzer 802 which outputs the pertinent information of user reaction and eye tracking of the audience.

The user reaction and eye tracking analyzer then sends an output to the split video manager 804 for splitting the video. The video-motif-to video-type inferencer 806 receives the output from the user reaction and eye tracking analyzer 802 for processing from the video motif to video type. The video composer 808 receives raw video stored in the video repository 810, and also the policy and rules information stored in the policy and privacy rules storage device 812. The video composer 808 then processes the information received from the video-motif-to video-type inferencer 806, with the information from the video repository 810 and policy and privacy rules storage unit 812 in order to compose the video for viewing by the audience 824 and 826 at the two different locations. The video composer 802 then stitches the video segments to form a full video to send back via an output signal 816 to the viewing stations 822 and 820.

Therefore, as shown in the above, the technology that enables instantiating video templates, from a set of possible embodiments is shown. Moreover, devices that allow monitoring and analyzing viewer focus, and can be easily adopted to identify an approximate zone of a given screen that a given viewer is focusing towards.

Additionally, other devices (wearable/smart/other) that can capture some of the biological parameters of a user (such as some of heart rate, breathing rate, perspiration rate, eye blinking rate, brain EEG signals etc.) can also be used. Such devices can be provided for the individual audience users 824 and 826 that can be communicate with the viewing stations 822 and 820.

One of the features of the disclosed invention is to be able run live A/B split testing within videos, including but not limiting to advertisements, and thereby determine what resonates and deliver significant messages (such as a "punch line" in ads, e.g., "drink ABC Cola") in a manner that would be individually or collectively the most acceptable to the viewers, as per the cognitive state they are inferred to be in. This involves presenting the viewer a video with multiple "initial", "intermediate" and "later" parts, the "later" part of which is dynamically selected from few potential choices of the "later" parts, based on viewers' individual and collective ("group-of-viewers") reaction to the "initial" part of the video.

Therefore, a system and methods implement a setting, in which, one of the following is implemented:

Option 1:

Different "initial" parts are shown to different audience segments, and while the "intermediate" part of the video is being shown, the "later" part of the video is chosen for the entire set of audiences, based upon the recorded collective viewer reaction, and a "later" part is chosen accordingly; and Option 2:

For each viewer, a series of different motifs are shown during different times within the "initial" period, and then, while the "intermediate" part of the video is being shown, the "later" part of the video is chosen in a personalized manner based upon the recorded reaction of each target viewer, and a "later" part is chosen accordingly.

These choices are implemented using a combination of the following factors:

(a) The observed viewer reaction, and the inferred semantics of such reaction, in the "initial" part of the video;

(b) Live (real-time) AB split testing of the viewer's attention on the screen;

(c) Identifying set of best choices of the "later" part of the video, given the reaction of a given viewer over multiple known segments of the given video, based upon live (real-time) AB split testing of the "initial" part of the video, for each given viewer;

(d) A/B split testing conducted in parallel, in a live setting in real time, across a multitude of audiences watching over multiple devices, for the "initial" part of the video, and observations aggregated in real-time to infer, and thereby choose embodiments of the "later" portion of the video catered to different segments of the viewers.

Example applications can be aligned to the advertising and video related products, UNICA-like products (Omnichannel marketing) can benefit from this, by implementing the disclosed invention as an improved dynamic advertising system. The disclosed invention can also be implemented in sales, marketing, and/or education videos it delivers to clients.

Exemplary Hardware and Cloud Implementation

Figure 9:
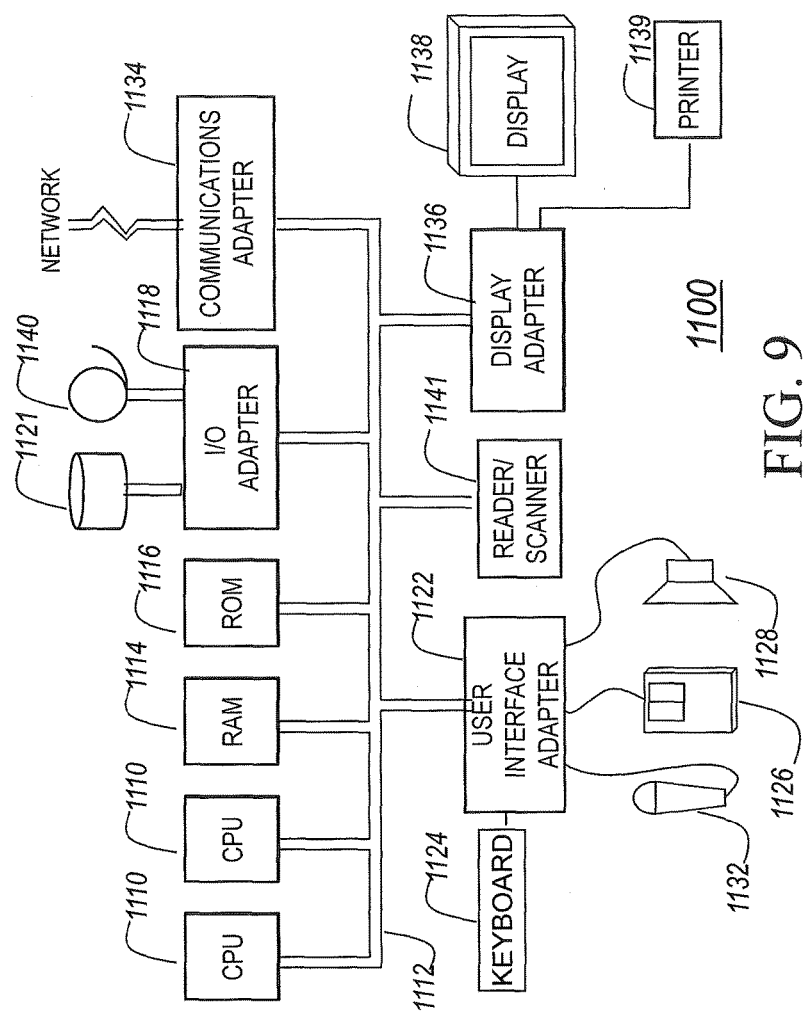
FIG. 9 illustrates an exemplary hardware/information handling system for incorporating the exemplary embodiment of the invention therein.

FIG. 9 illustrates another hardware configuration of an information handling/computer system 1100 in accordance with the disclosed invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Figure 10:
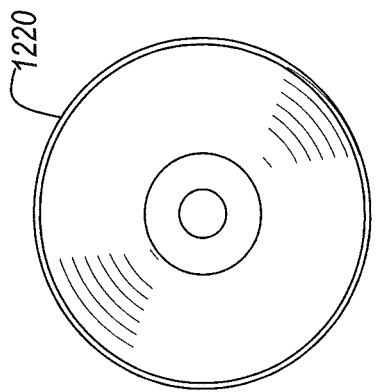
FIG. 10 illustrates a signal-bearing storage medium for storing machine-readable instructions of a program that implements the method according to the exemplary embodiment of the invention.
Figure 10:
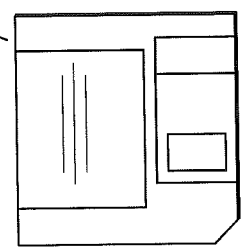

Alternatively, the instructions may be contained in another signal-bearing storage media 1200, such as a magnetic data storage diskette 1210 or optical storage diskette 1220 (FIG. 10), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
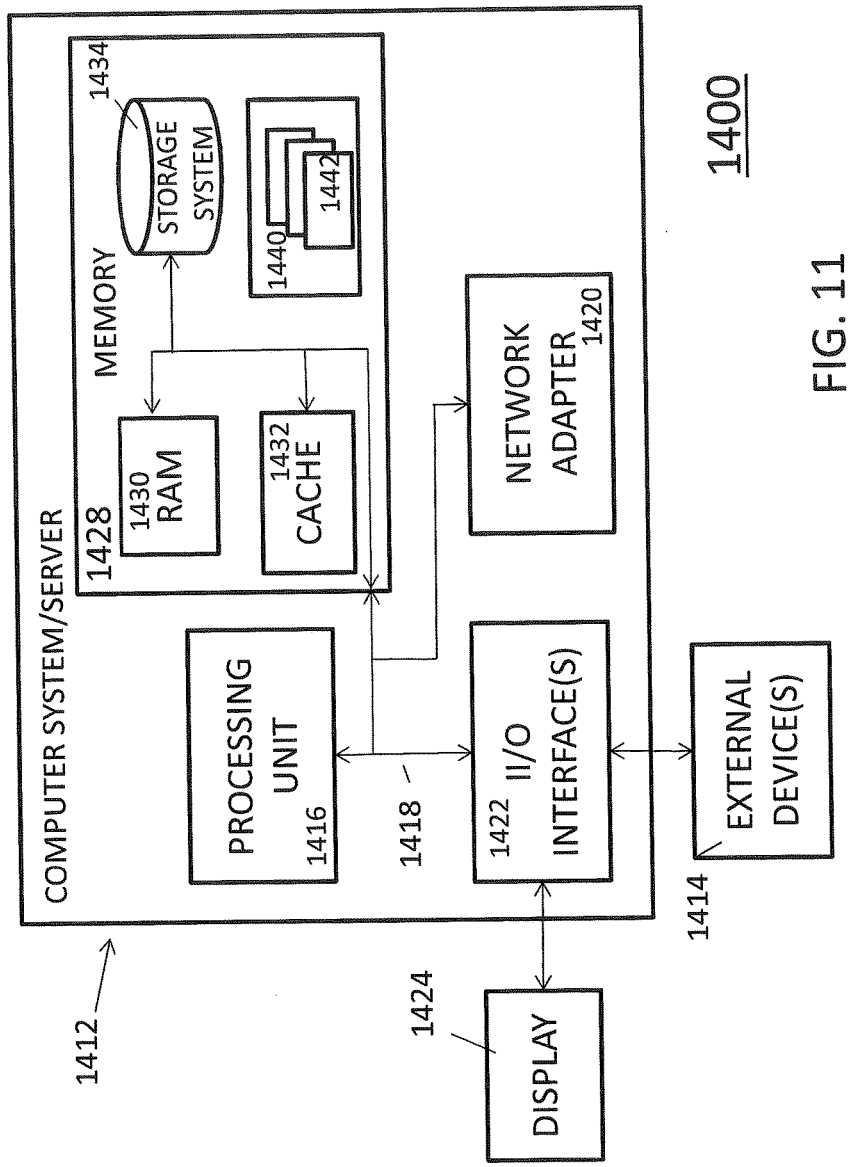
FIG. 11 depicts a cloud computing node according to an embodiment of the disclosed invention.

Referring now to FIG. 11, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 12:
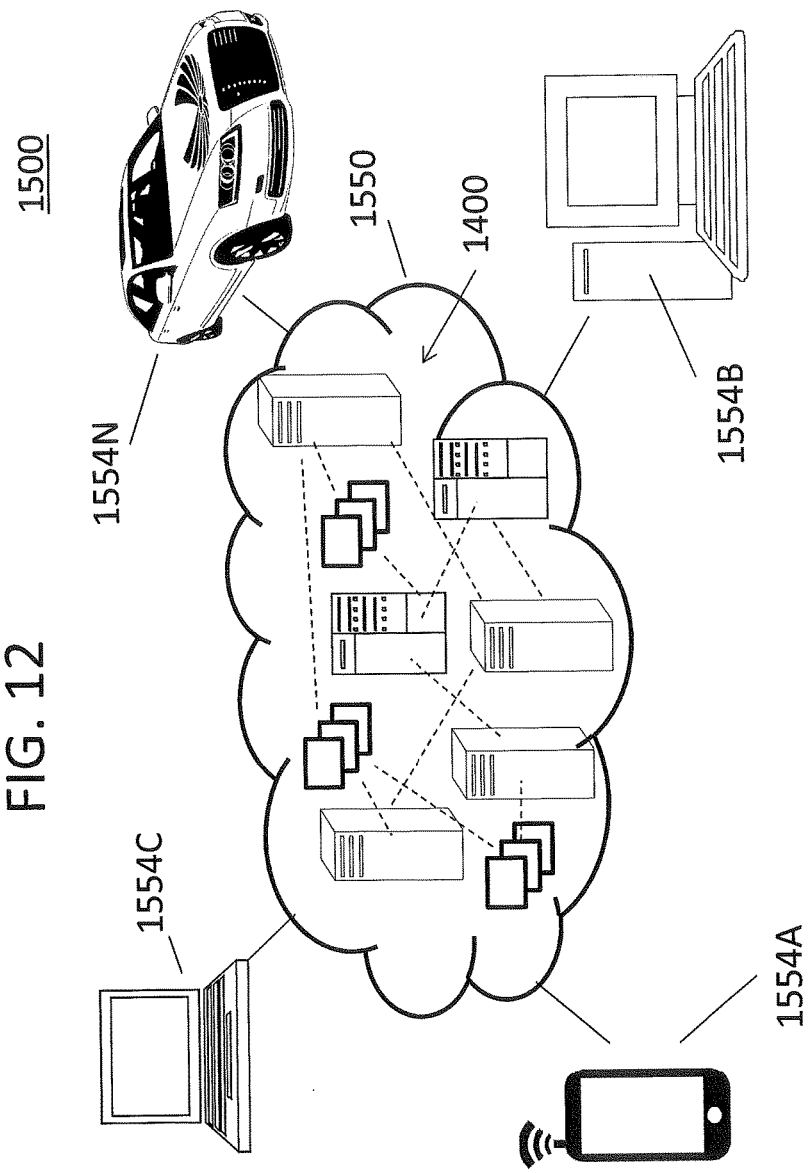
FIG. 12 depicts a cloud computing environment according to an embodiment of the disclosed invention.

Referring now to FIG. 12, illustrative cloud computing environment 1550 is depicted. As shown, cloud computing environment 1550 comprises one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 12 are intended to be illustrative only and that computing nodes 1400 and cloud computing environment 1550 can communicate with any type of computerized device over any type of network and/or network addressable connection (e.g., using a web browser).

Figure 13:
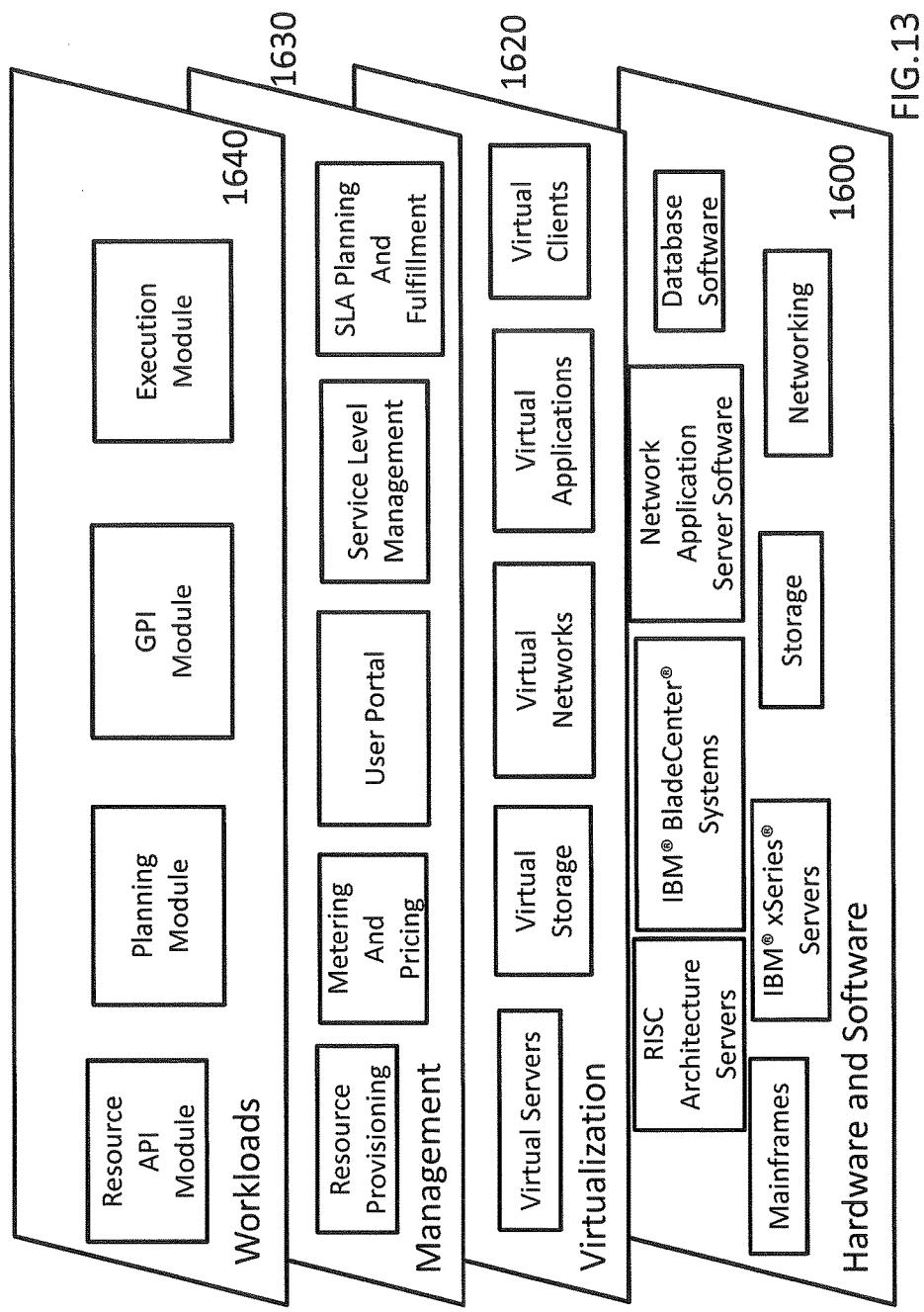
FIG. 13 depicts abstraction model layers according to an embodiment of the disclosed invention.

Referring now to FIG. 13, a set of functional abstraction layers provided by cloud computing environment 1550 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the disclosed invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for A/B split testing, comprising:
a storage device storing a set of data;
a processor coupled to the storage device;
an input device receiving input from a sensor according to a review of composed set of data;
the processor configured to receive an input signal from the input device, the input signal including a plurality of criteria noted according to a time of the composed set of data, the processor processing a first set of data according to a feedback of the input signal,
wherein the processor is configured to analyze the input signal and extracts the plurality of criteria from the input signal as extracted information, and
wherein the processor is configured to dynamically compose a set of data in real-time including transition boundaries among different groups of the set of data from the storage device according to the extracted information, and sends the composed set of data, time segment by time segment, to the input device according to the feedback of the input signal, further comprising a server comprising the processor, the server being a virtual server in the clouds,
the composed data is dynamically initialized from a given template,
wherein the processor selects and organizes in parallel the transition to the next frame segment of the video stream from among the optional frame segments according to the feedback from the live A/B split testing of previous frame segments for each of the different geo-locations.

2. A system for A/B split testing, comprising:
a storage device storing a set of data;
a processor coupled to the storage device;
an input device receiving input from a sensor according to a review of composed set of data;
the processor configured to receive an input signal from the input device, the input signal including a plurality of criteria noted according to a time of the composed set of data, the processor processing a first set of data according to a feedback of the input signal,
wherein the processor is configured to analyze the input signal and extracts the plurality of criteria from the input signal as extracted information, and
wherein the processor is configured to dynamically compose a set of data in real-time including transition boundaries among different groups of the set of data from the storage device according to the extracted information and sends the composed set of data, time segment by time segment, to the input device according to the feedback of the input signal, further comprising a second storage device storing policy and privacy rules, the processor composing the set of data from the first storage device according to the policy and privacy rules,
wherein the set of data comprises a video steam,
wherein the processor runs live A/B split testing in parallel within the video stream at different geo-locations,
wherein the video stream includes a plurality of frames grouped into a plurality of frame segments including a group of optional frame segments,
wherein the transition boundaries comprises a transition from one of the plurality of frame segments of the video stream to a next frame segment, and
wherein the processor selects and organizes in parallel the transition to the next frame segment of the video stream from among the optional frame segments according to the feedback from the live A/B split testing of previous frame segments for each of the different geo-locations.

3. A system for A/B split testing, comprising:
a storage device storing a set of data;
a processor coupled to the storage device;
an input device receiving input from a sensor according to a review of composed set of data;
the processor configured to receive an input signal from the input device the input signal including a plurality of criteria noted according to a time of the composed set of data, the processor processing a first set of data according to a feedback of the input signal,
wherein the processor is configured to analyze the input signal and extracts the plurality of criteria from the input signal as extracted information, and
wherein the processor is configured to dynamically compose a set of data in real-time including transition boundaries among different groups of the set of data from the storage device according to the extracted information, and sends the composed set of data, time segment by time segment, to the input device according to the feedback of the input signal,
wherein the set of data comprises a video,
wherein the processor runs live A/B split testing in parallel within the video at different geo-locations,
wherein the video includes a plurality of frames in sequence grouped into a plurality of frame segments,
wherein the plurality of frame segments includes a plurality of different critical segments, and
wherein the processor selects in parallel one of the critical segments according to the feedback from the live A/B split testing of previous frame segments for each of the different geo-locations.

* * * * *